Feb. 5, 1935.    C. E. JOHNSON    1,989,987
PISTON RING EXPANDER
Filed Nov. 6, 1933
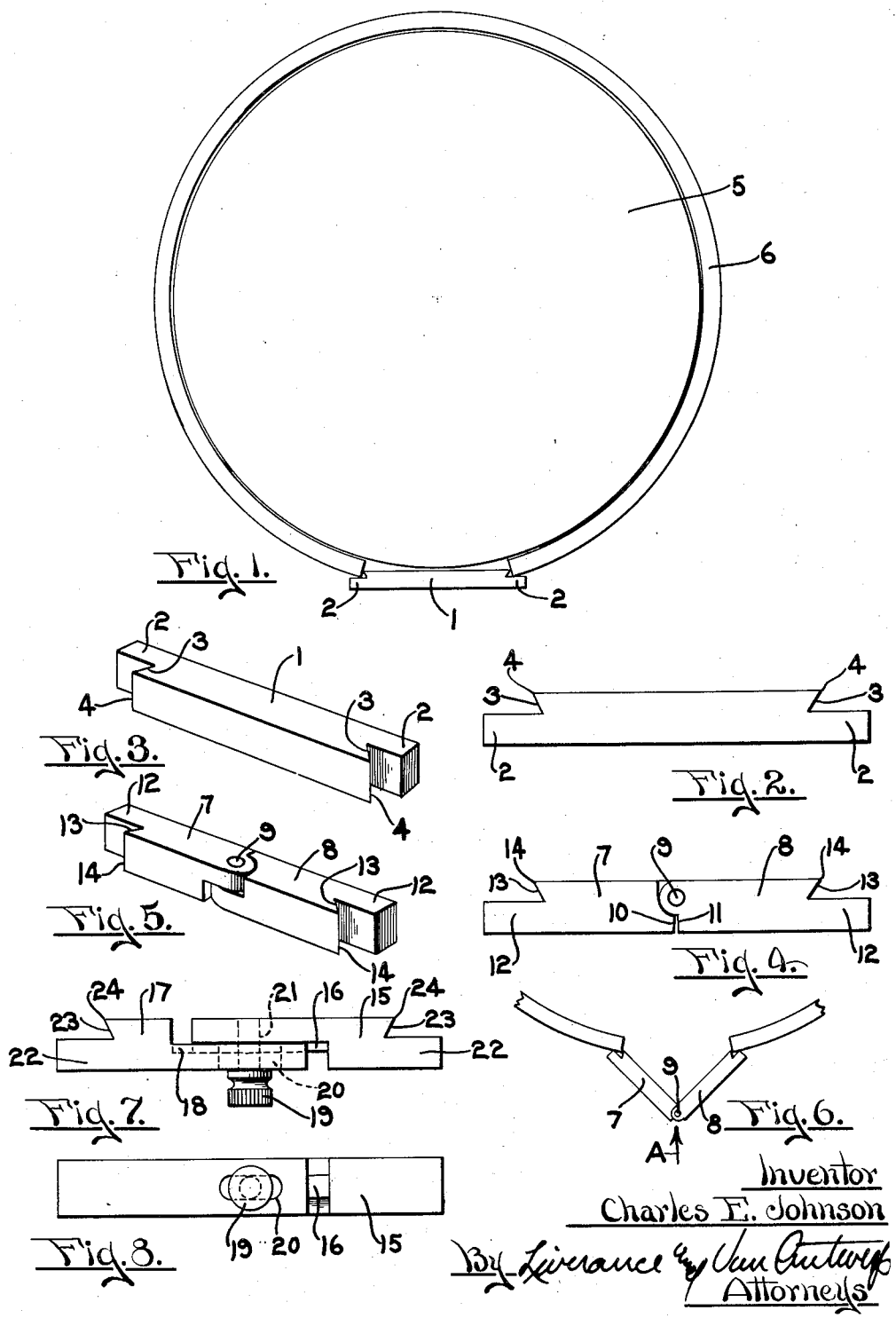
Inventor
Charles E. Johnson
By Liverance & Van Antwerp
Attorneys Patented Feb. 5, 1935

1,989,987

UNITED STATES PATENT OFFICE 1,989,987

PISTON RING EXPANDER

Charles E. Johnson, North Muskegon, Mich.

Application November 6, 1933, Serial No. 696,771

1 Claim. (Cl. 29—86.4)

This invention relates generally to the piston ring art and more particularly deals with means for expanding a piston ring and maintaining the ring in such an expanded condition.

A difficulty always encountered in the removal and installation of piston rings lies in expanding them to a size whereby they may be readily slid over or removed from the piston with which they are associated and it is a primary purpose of this invention to provide means for expanding piston rings to a predetermined dimension whereby they may be quickly and expediently installed or removed with respect to their proper grooves upon the piston.

Briefly described, my invention consists of an expander, which may be adjustable in length, together with means for holding the expander in its proper position relative to the ends of the ring.

Another advantage of my construction resides in the provision of a pivot between its ends, this materally aiding in the application of my appliance to a piston ring.

Further advantages will become apparent as the invention is understood.

In the drawing:—

Fig. 1 is a plan view of a piston ring, equipped with my novel spreader, during its removal or insertion relative to a piston.

Fig. 2 is an enlarged plan view of the ring spreader.

Fig. 3 is a perspective view of the ring spreader.

Fig. 4 is a plan view of a modified form of my invention.

Fig. 5 is a perspective view of the modified form disclosed in Fig. 4.

Fig. 6 is a plan view of the hinged ring spreader of Figs. 4 and 5 shown between the ends of a piston ring before spreading of the ring.

Fig. 7 is a plan view of a second modification.

Fig. 8 is a front view of Fig. 7.

Like reference numerals refer to like parts throughout the several figures of the drawing.

The piston ring spreader of my invention consists of an elongated bar of metal, as indicated by the reference numeral 1. See Figs. 1, 2 and 3. The bar is notched at each end at one side thereof so as to leave a projecting finger 2 and a shoulder 3. The portion of the notch forming the shoulder is cut deeper at the inner than at the outer edge and thus a relatively sharp gripping or contacting edge 4 is had.

Referring particularly to Fig. 1, numeral 5 designates a piston, this having the usual grooves, not shown, to which piston rings, one being indicated at 6, are to be applied and removed as desired.

As shown in Fig. 1 the piston ring 6 has been spread to such an extent that the gripping edges 4 of the spreader are positioned between the ends of the piston ring 6 whereby the ring is held in spread position. The sharp gripping edges, engaging the ends of the ring, securely maintain the spreader in place between the ends of the ring. In this spread position the ring is held so that the inner diameter of the ring is slightly larger than the outer diameter of the piston whereby the ring may be easily slipped off or inserted into the ring groove. The gripping edges of the spreader are located a predetermined distance apart whereby they will hold the ends of the ring far enough apart so that the inner diameter of the ring is only a few thousandths of an inch larger than the outer diameter of the piston and thereby the ring is not spread excessively. Excessive spreading of the ring not only may cause actual breakage but oftentimes materially distorts the ring so as to cause irregular and eccentric action therein.

Figs. 4, 5 and 6 show a modified form of my ring spreader. Two body portions, 7 and 8, are pivoted together as at 9, and formed with stop shoulders 10 and 11, respectively. The outer ends of the body portions 7 and 8 are similarly formed, being notched to form fingers 12, shoulders 13 and gripping edges 14.

This type of spreader, namely, the folding spreader, may, in its folded position, be positioned between the closed or partially closed ends of the ring and when pushed inwardly, as indicated by the arrow A in Fig. 6, will cause the ring to spread to its proper enlarged position. Both of the sections of the folding type spreader have stop shoulders, as previously described, these stop shoulders coming in contact when the spreader is straightened out between the ends of the ring. The stop shoulders limit the inward movement of the pivot 9 of the spreader when the pivot has passed inwardly past the line of force thereby creating a toggle action for holding the spreader in its straightened position. The folding spreader, in operative position, holds the ring with its inner diameter slightly larger than the outer diameter of the piston and thus movement of the ring to or from its operative position may be easily and quickly accomplished without injury to the ring.

The spreader shown in Figs. 7 and 8 is of the longitudinal adjustable type. This type is used when rings of varying sizes are to be removed from pistons in which case the spreader is adjusted to the length whereby it will hold the ring to the proper size for removal from the piston. This adjustable spreader is made from a body portion 15, having a rib 16, and a second body portion 17, grooved as at 18, the rib 16 engaging the groove 18 whereby sliding movement may be had between these two members. A thumb screw 19 passes through a slot 20 in the member 17 and threads at 21 into the member 15 providing means for locking the adjustable members in the desired position.

The outer ends of the members 15 and 17 are provided with the usual fingers 22, shoulders 23 and slightly serrated edges 24. If desired, these edges 24 and shoulders 23 may be formed of any suitable conformation so as to properly engage with the ends of the piston ring which is being spread.

Having thus described my invention, I desire it to be understood that the invention is in no wise limited to the particular illustrative embodiments disclosed, the scope thereof being set forth in the following claim.

I claim:

A piston ring expander comprising, two body members pivoted together, shoulders formed at the ends of said body members, said shoulders extending longitudinally of the bar and being in the plane of the pivot, and stop means on the respective bars to prevent pivotal movement thereof beyond a predetermined point.

CHARLES E. JOHNSON.